United States Patent
Kutalek et al.

(10) Patent No.: US 9,270,093 B2
(45) Date of Patent: Feb. 23, 2016

(54) COMPACT MEDIUM VOLTAGE AIR INSULATED SWITCHGEAR USING REAR MOUNTED CURRENT TRANSFORMERS AND BUSHINGS OF DIFFERENT LENGTH

(71) Applicant: ABB Technology AG, Zurich (CH)

(72) Inventors: Zdenek Kutalek, Brno-Kohoutovice (CZ); Stefano Motta, Besana Brianza (IT); Amar G. Kini, Lake Mary, FL (US); Frantisek Koudelka, Modrice (CZ)

(73) Assignee: ABB Technology AG, Zurich (CH)

( * ) Notice: Subject to any disclaimer, the term of this patent is extended or adjusted under 35 U.S.C. 154(b) by 223 days.

(21) Appl. No.: 14/098,581

(22) Filed: Dec. 6, 2013

(65) Prior Publication Data
US 2015/0162726 A1    Jun. 11, 2015

(51) Int. Cl.
*H02B 1/20* (2006.01)
*H02B 13/00* (2006.01)
*H01B 17/58* (2006.01)
*H02B 11/26* (2006.01)
*H02B 13/035* (2006.01)

(52) U.S. Cl.
CPC ............ *H02B 13/005* (2013.01); *H01B 17/583* (2013.01); *H02B 11/26* (2013.01); *H02B 13/0356* (2013.01)

(58) Field of Classification Search
CPC ............................ H02B 13/005; H01B 17/583
See application file for complete search history.

(56) References Cited

U.S. PATENT DOCUMENTS

| | | | | |
|---|---|---|---|---|
| 3,793,562 A * | 2/1974 | Cleaveland | ........... | H02B 11/167 174/152 R |
| 4,118,755 A * | 10/1978 | Davies | ...................... | H02B 1/56 174/16.1 |
| 4,343,030 A * | 8/1982 | Date | ..................... | H01H 3/3042 200/400 |
| 7,286,337 B2 * | 10/2007 | Masuhara | ............ | H02B 11/167 361/603 |
| 7,450,368 B2 * | 11/2008 | Parker | ...................... | H02B 1/20 361/600 |

FOREIGN PATENT DOCUMENTS

| | | |
|---|---|---|
| GB | 2338600 A | 12/1999 |
| JP | S5798102 U | 6/1982 |
| JP | S5880718 U | 6/1983 |

OTHER PUBLICATIONS

International Search Report and Written Opinion in PCT/US2014/068255 dated Feb. 16, 2015.

\* cited by examiner

*Primary Examiner* — Gregory Thompson
(74) *Attorney, Agent, or Firm* — Manelli Selter PLLC; Edward J. Stemberger

(57) ABSTRACT

A switchgear includes a housing having a wall separating a circuit breaker compartment from a bus/cable compartment. A plurality of bushings is provided. Each bushing has first and second portions. Each bushing extends through the wall so that the first portion is disposed in the circuit breaker compartment and the second portion is disposed in the bus/cable compartment. Each second portion has an extension. At least one current transformer is mounted on the extension of the second portion of each bushing. The extensions are constructed and arranged so that a phase to phase distance is 180 mm or less. Such a configuration also decreased the overall size of the switchgear.

17 Claims, 4 Drawing Sheets

COMPACT MEDIUM VOLTAGE AIR INSULATED SWITCHGEAR USING REAR MOUNTED CURRENT TRANSFORMERS AND BUSHINGS OF DIFFERENT LENGTH

FIELD

The invention relates to switchgear circuit breakers and, more particularly, to current transformers mounted on bushings in a bus/cable compartment to reduce phase to phase distance and overall dimensions of the switchgear.

BACKGROUND

With reference to FIG. 1, an example of a conventional medium voltage switchgear is shown generally at 10. As used herein, the terms "medium voltage switchgear" refers to switchgear rated for operation up to and including 15 kV. In general, switchgear 10 comprises an enclosure, such as metal-clad enclosure 12, for housing the switchgear components. Enclosure 12 may contain one or more separate compartments, such as circuit breaker compartment 14, main bus compartment 16, and cable compartment 18. The bus and cable compartments can be formed as a single compartment. Switchgear 10 contains one or more circuit breakers, generally indicated at 20. In the embodiment shown, circuit breaker 20 is a three-pole drawout type circuit breaker. Circuit breaker 20 is connected to primary contacts that are supported by primary conductor bushings 22 that are connected to current-carrying bus bars 24.

In this typical switchgear arrangement, the current transformers 26 are mounted in the circuit breaker compartment 14. The inner diameter of the current transformer 26 has to be large enough to allow the primary conductor bushing 22 to pass through and mount concentrically. The bushing 22 extends through a wall 28 that separates the circuit breaker compartment 14 from the bus and cable compartments 16, 18. As shown in FIG. 2, this arrangement results in large current transformer coils, increasing the phase to phase distance $P_1$ (e.g., greater than 180 mm), the length $L_1$ and the width $W_1$ of the circuit breaker compartment 14 and thus increases the overall dimensions of the switchgear 10.

Thus, there is a need to provide current transformers on bushings in a bus/cable compartment to reduce the phase to phase distance, length and width of the circuit breaker compartment, and thus reduce the overall dimensions of the switchgear.

SUMMARY

An objective of the invention is to fulfill the need referred to above. In accordance with the principles of the present invention, this objective is achieved by providing a switchgear that includes a housing having a wall separating a circuit breaker compartment from a bus/cable compartment. A plurality of bushings is provided. Each bushing has first and second portions. Each bushing extends through the wall so that the first portion is disposed in the circuit breaker compartment and the second portion is disposed in the bus/cable compartment. Each second portion has an extension. At least one current transformer is mounted on the extension of the second portion of each bushing. The extensions are constructed and arranged so that a phase to phase distance is 180 mm or less. Such a configuration also decreased the overall size of the switchgear.

In accordance with another aspect of an embodiment, a method of reducing a phase to phase distance in a switchgear provides a wall in the housing of the switchgear so that the wall separates a circuit breaker compartment from a bus/cable compartment. Bushings are mounted with respect to the wall so that each bushing extends through the wall, with a first portion of each bushing is disposed in the circuit breaker compartment and a second portion of each bushing is disposed in the bus/cable compartment. Each second portion has an extension constructed and arranged so that a phase to phase distance is 180 mm or less. At least one current transformer is mounted on the extension of the second portion of each bushing.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 3:
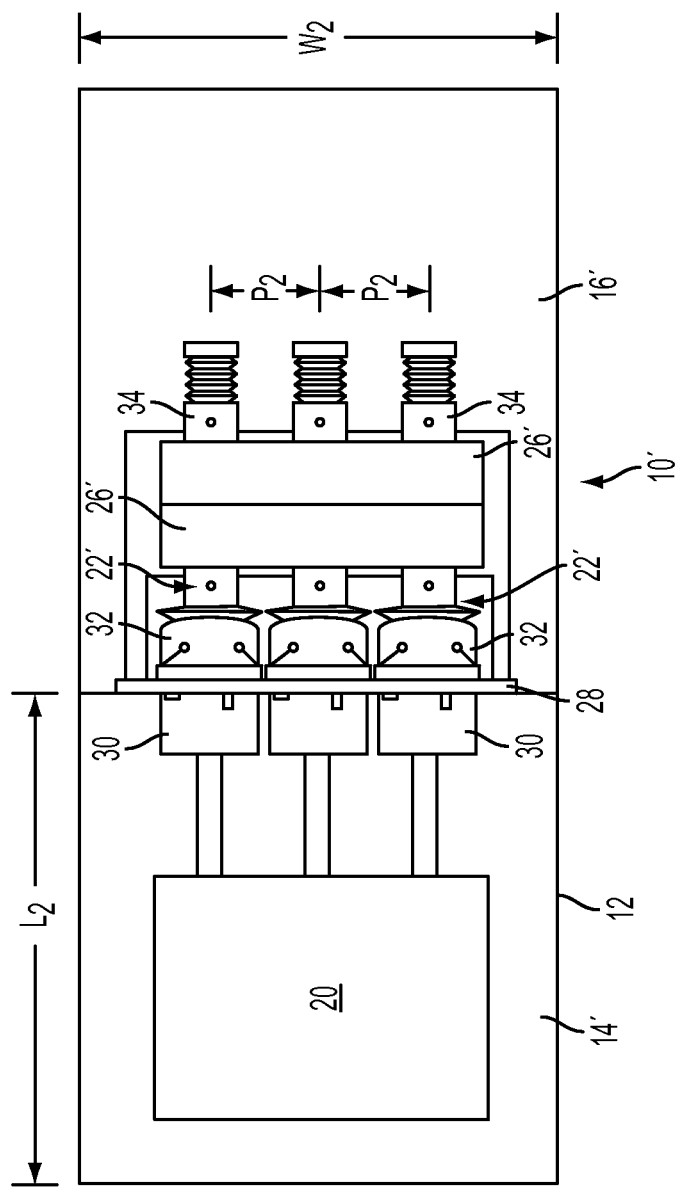
FIG. 3 is top view of current transformers mounted on bushings in a bus/cable compartment of a switchgear in accordance with an embodiment.
Figure 4:
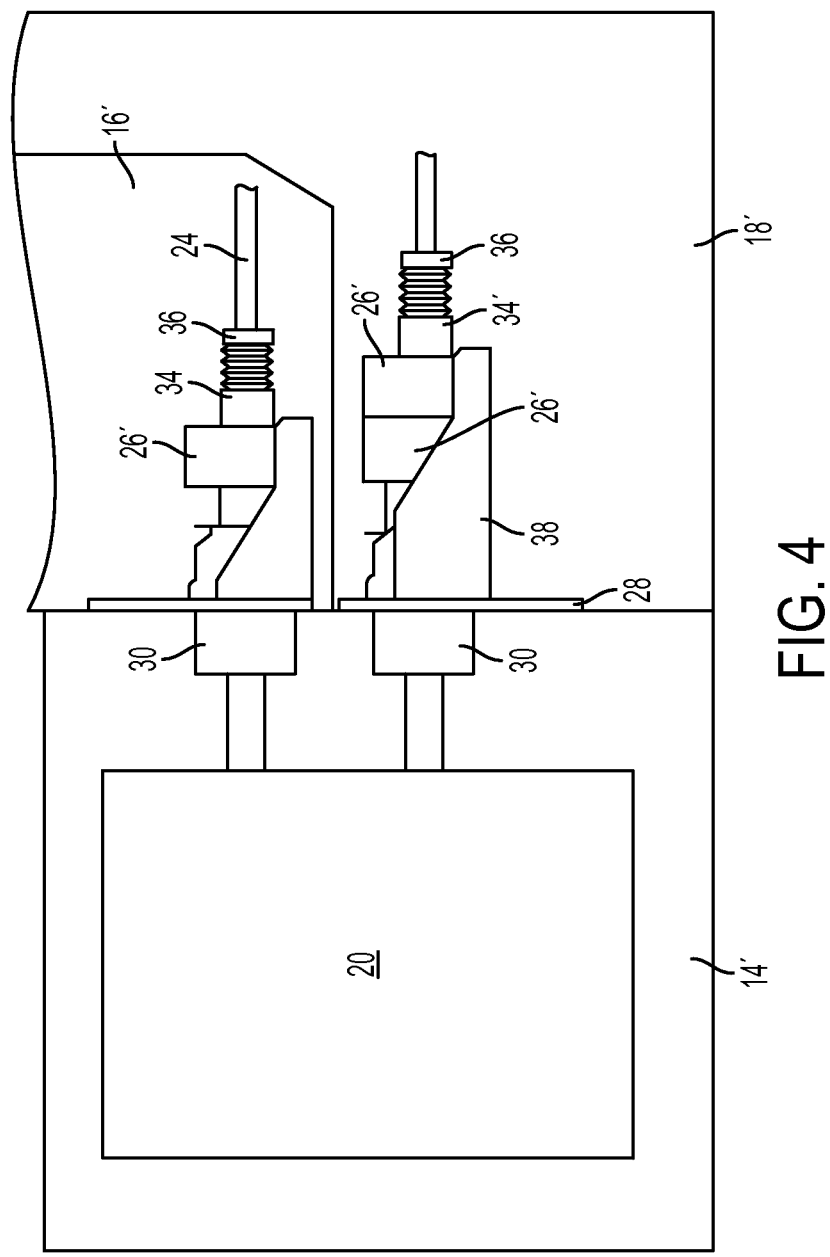
FIG. 4 is a side view of current transformers and bushings of the type shown in FIG. 3, with the bushings being of different length.

With reference to FIG. 3, an air insulated switchgear 10' includes a housing 12 having a wall 28 separating a circuit breaker compartment 14' from a bus/cable compartment 16'. As used herein, bus/cable compartment 16' can include a main bus compartment only or a combined main bus compartment 16' and cable compartment 18'. In accordance with an embodiment, a plurality of primary conductor bushings 22' are provided, each extending through the wall 28 so that a cylindrical first portion 30 is disposed in the circuit breaker compartment 14' together with the circuit breaker 20, electrically coupled therewith. As seen in FIG. 3, three bushing 22' are provided for a three-phase switchgear 10'. A cylindrical second portion 32 of each bushing 22' is disposed in the bus/cable compartment 16'. One or more compact current transformers 26' is mounted concentrically on a cylindrical extension 34 of the second portion 32 of each bushing 22'. Extension 34 has a diameter that is less than the diameter of the first portion 30. As shown in FIG. 4, a copper busbar 24 is coupled to the end of each extension 34 and thus is in the bus/cable compartment 16' as well.

FIG. 4 also show an elongated extension 34' for receiving more than one current transformers 26'. Thus, extension 34' is longer than extension 34. By employing a combination of shorter and longer bushings 22' (or extensions thereof), copper busbar run length is advantageously shortened. A tray 38, coupled to the wall 28 and disposed in the bus/cable compartment 16', can be provided to support the associated current transformers 26'.

Figure 1:
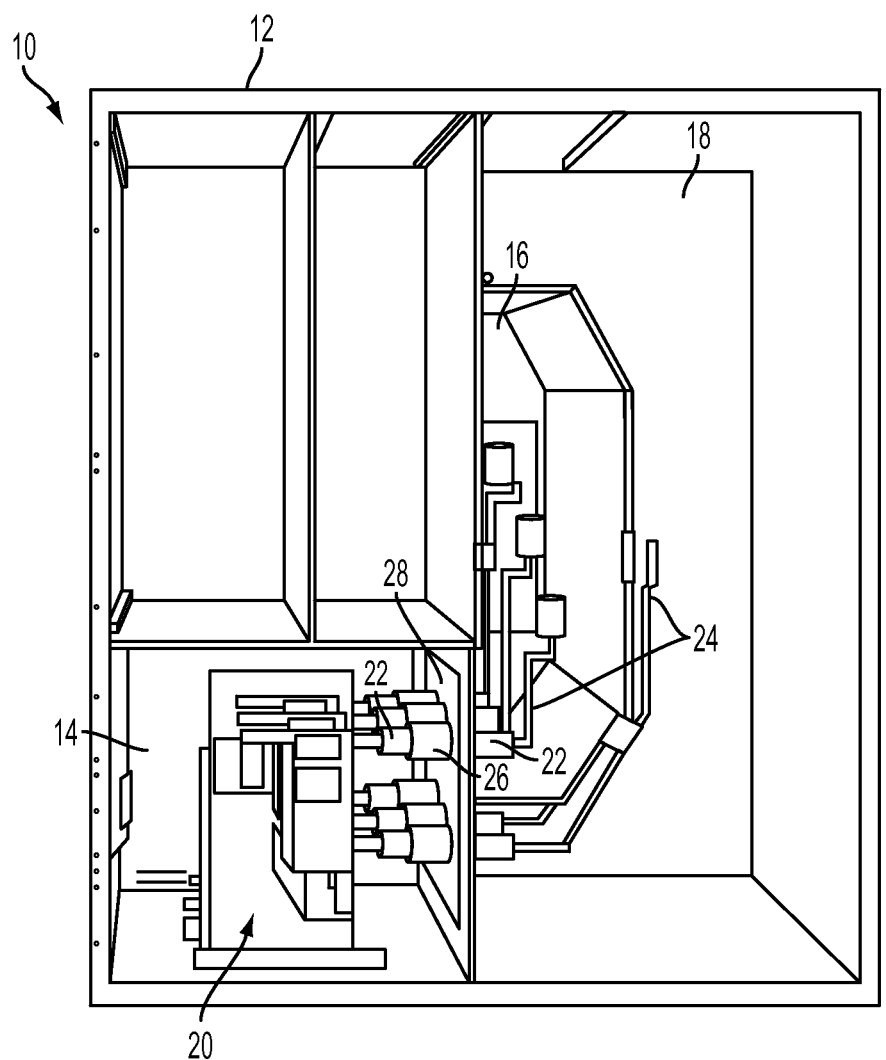
FIG. 1 is a side view of a conventional medium voltage switchgear.
Figure 2:
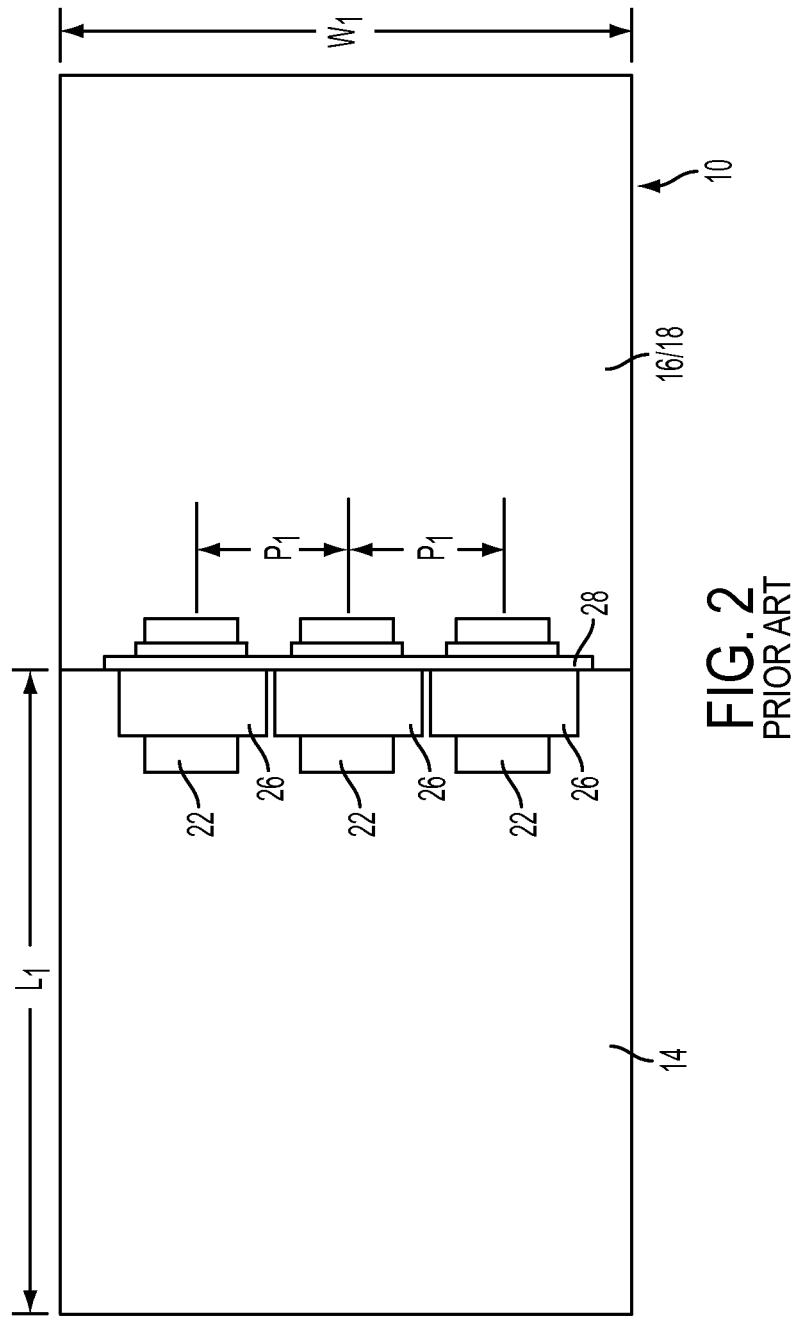
FIG. 2 is an enlarged top view of current transformers of the switchgear of FIG. 1, shown concentrically mounted over an associated bushing in the circuit breaker compartment.

This space saving configuration that combines the current transformer 26' with the associated bushing 22', reduces the phase to phase distance $P_2$ to 180 mm or less in medium voltage switchgears rated up to and including 15 kV. This is due to the extensions 34 being able to be mounted close together. As shown in FIG. 3, this configuration also reduces the length $L_1$ and the width $W_1$ of the circuit breaker compartment 14' and thus decreases the overall dimensions of the switchgear 10', as compared to the switchgear 10 of FIGS. 1 and 2. Such space savings is achieved by moving current transformers 26' to the bus/cable compartment 16'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A switchgear comprising:
a housing having a wall separating a circuit breaker compartment from a bus/cable compartment,
a plurality of bushings, each having first and second portions, each bushing extending through the wall so that the first portion is disposed in the circuit breaker compartment and the second portion is disposed in the bus/cable compartment, each second portion having an extension, and
at least one current transformer mounted on the extension of the second portion of each bushing,
wherein the extensions are constructed and arranged so that a phase to phase distance is 180 mm or less.

2. The switchgear of claim 1, wherein for each bushing, the extension has a peripheral size that is less than a peripheral size of the first portion so that the phase to phase distance is 180 mm or less.

3. The switchgear of claim 2, wherein each current transformer is mounted concentrically on the extension of each bushing.

4. The switch gear of claim 1, wherein the switchgear is a medium voltage switchgear constructed and arranged to be rated up to and including 15 kV.

5. The switchgear of claim 1, further comprising a circuit breaker in the circuit breaker compartment, the circuit breaker being electrically coupled with the bushings.

6. The switchgear of claim 1, wherein the extension of one of the bushings is longer than the extension of another of the bushings.

7. The switchgear of claim 6, wherein the one of the bushings includes one current transformer on the extension thereof, and the another of the bushings includes more than one current transformer on the extension thereof.

8. The switchgear of claim 6, further comprising a busbar coupled to an end of each extension.

9. The switchgear of claim 1, further comprising a tray coupled to the wall and disposed in the bus/cable compartment for supporting the current transformer mounted on each bushing.

10. A method of reducing a phase to phase distance in a switchgear, the method comprising the steps of:
providing a wall in the housing of the switchgear so that the wall separates a circuit breaker compartment from a bus/cable compartment,
mounting a plurality of bushings with respect to the wall so that each bushing extends through the wall, with a first portion of each bushing being disposed in the circuit breaker compartment and a second portion of each bushing being disposed in the bus/cable compartment, each second portion having an extension constructed and arranged so that a phase to phase distance is 180 mm or less, and
mounting at least one current transformer on the extension of the second portion of each bushing.

11. The method of claim 10, wherein for each bushing, the extension has a peripheral size that is less than a peripheral size of first portion so that the phase to phase distance is 180 mm or less.

12. The method of claim 10, wherein the switchgear is a medium voltage switchgear constructed and arranged to be rated up to and including 15 kV.

13. The switchgear of claim 10, further comprising the step of electrically coupling a circuit breaker, in the circuit breaker compartment, with the bushings.

14. The method of claim 10, wherein the extension of one of the bushings is longer than the extension of another of the bushings.

15. The method of claim 14, wherein the step of mounting the bushings includes mounting one current transformer on the extension of the one of the bushings and mounting more than one current transformer on the extension of the another of the bushings.

16. The method of claim 14, further comprising the step of coupling a busbar to an end of each extension.

17. The method of claim 10, further comprising the step of coupling a tray to the wall so that the tray is disposed in the bus/cable compartment to support the current transformer mounted on each bushing.

* * * * *